May 28, 1946. E. S. ARNOLD 2,401,129
VALVE
Filed March 6, 1945
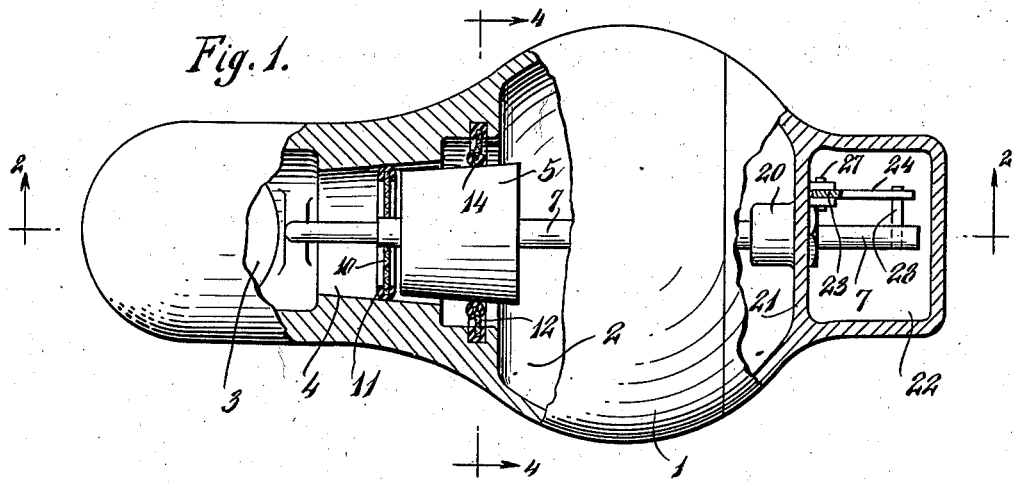
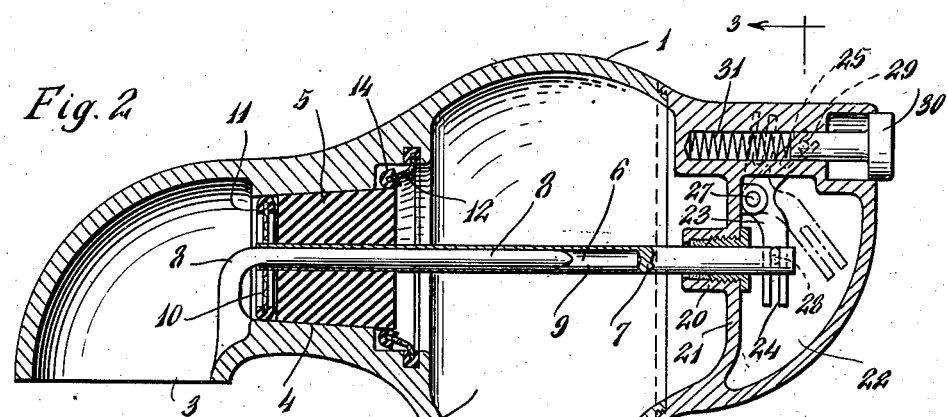
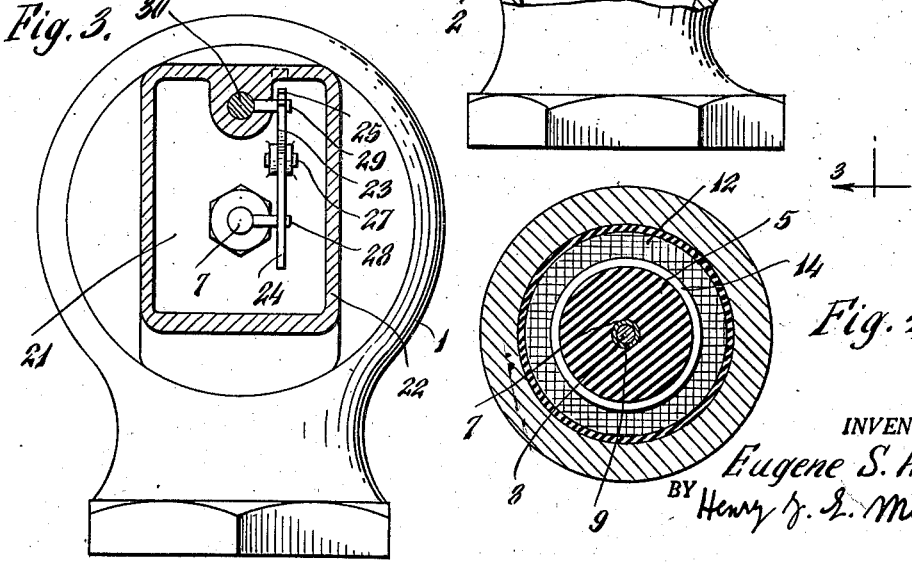
INVENTOR.
Eugene S. Arnold
BY Henry J. E. Metzler
Agt.

Patented May 28, 1946

2,401,129

UNITED STATES PATENT OFFICE 2,401,129

VALVE

Eugene S. Arnold, Cleveland, Ohio

Application March 6, 1945, Serial No. 581,257

2 Claims. (Cl. 251—137)

This invention relates to improvements in valves, primarily to faucet valves, but the improved valve construction according to the present invention can also be used for steam, oil, air, and gas valves as well as for controlling chemicals and precious fluids.

One object of the present invention is the provision of an improved valve which will allow no dripping, and which utilizes the pressure of the fluid controlled by the valve for tightening its closure mechanisms since it works with the pressure of the fluid, not against it, as will be explained more fully hereinafter in the description;

Another object of the present invention is the provision of a valve of the character described which will prevent any grit and foreign matter in the liquid from lodging on surfaces of the valve seat and on other tightening means, so that leaks are practically impossible;

Still another object of the present invention is the provision of an improved valve which is adapted for direct connection to the water supply main irrespective of the pressure therein which is simple and robust in construction, and since it has the minimum number of moving parts consequently needs little or no attention over long periods of service.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing:

Figure 1 is a top plan view of a preferred embodiment of my invention as it appears with the outer valve casing partially broken away and when the valve is open;

Figure 2 is a sectional view on the line 2—2 of Figure 1, showing the valve in its closed position;

Figure 3 is a cross-sectional view on the line 3—3 of Figure 2; and

Figure 4 is a cross-sectional view on the line 4—4 of Figure 1.

Similar numerals refer to similar parts throughout the several views.

In the drawing, the numeral 1 denotes a valve casing which has an intake portion 2 that is connected to its outlet portion 3 by means of a tapered channel 4. The channel 4, which tapers at about five degrees toward the outlet portion 3, serves as a runway for a correspondingly tapered plug 5, which closes the channel 4 when its major portion is tightly inserted into the major portion of channel 4 as may be seen in Figure 2. The plug 5 is secured to the hollow portion 6 of a movable shaft 7 which is guided by a stationary shaft 8, that is secured to the outlet portion 3 and that is partially extended into the hollow portion 6 of shaft 7. The bore in the hollow shaft portion 6 is so deep that it will afford sufficient end clearance to allow any fluid that may be compressed therein to drain off through a small key way 9 or the like.

A flexible, permeable disk having a soft resilient outer periphery, preferably a flexible copper wire mesh disk 10 having a soft rubber edge 11, is attached to the outer extremity of the hollow portion 6 of the movable shaft 7, so that the channel runway 4 will be cleaned at each reciprocating movement of the shaft 7 and of the plug 5. Likewise, a flexible permeable collar having a soft resilient inner periphery, preferably a flexible copper wire mesh screen collar 12 having a soft inner rubber edge 14, is secured to the interior of casing 1 near the wider opening of channel 4. The soft edge 14 encompasses and rests against the outer surface of plug 5, so that the plug 5 will be cleaned at each opening or closing movement. This cleansing action of the soft edges 11 and 14 will prevent the lodging of grit and foreign matter on the surface of the plug 5 and of the channel runway 4 respectively, thus insuring absolute tightness of the closed valve at all times.

The reciprocation or the opening and closing movement of the shaft 7 and of the plug 5 can be caused by any suitable means the details of which will depend upon the purpose for which a particular valve is intended. In the case of a faucet valve as shown in the drawing, I prefer to extend the solid portion of shaft 7 through a packing 20 in a wall 21, which separates the major portion of the interior of casing 1 from a compartment 22; a bell crank lever 23 having slotted arms 24 and 25 is pivotally secured at 27 in the compartment 22, and the slotted arms 24 and 25 engage pins 28 and 29 respectively; pin 28 is carried by the outer extremity of the solid portion of shaft 7, and pin 29 is carried by a push rod 30 which extends through the outer wall of compartment 22; a spring 31 tends to hold the rod 30, lever 23, shaft 7 and plug 5 in the "closed" position shown in Fig. 2. If rod 30 is pressed inwardly, the lever 23 will be in the position indicated in dash-and-dotted lines in Fig. 2, and the valve will be open as shown in Fig. 1. If the manual pressure is released from rod 30, the parts 5, 7, 23, and 30 will move back to the "closed" position and the pressure of the fluid will aid in pressing the plug 5 tightly into the runway of channel 4.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

Having thus described my invention, what I claim and desire to secure by Letters Patent in the United States is:

1. An improved valve comprising a casing which has an intake and an outlet portion and which is provided with a tapered channel that connects said intake to said outlet portion, a tapered plug whose major portion is adapted to fit tightly into the major portion of said channel, a movable shaft having a tubular portion which is extended into said channel and to which said plug is secured, a stationary shaft secured to said outlet portion and extending partially into the tubular portion of said movable shaft, a flexible permeable disk having a resilient outer periphery and being attached to the outer extremity of the tubular portion of said movable shaft and resting with its outer periphery against the inner surface of the narrower portion of said tapered channel, a flexible permeable collar having a resilient inner perimeter which rests against the outer surface of said plug and being attached to the interior of said casing near said channel, means for reciprocating said movable shaft, and resilient means for pressing said movable shaft and said plug into said channel, said channel and said plug tapering toward said outlet portion, all substantially as set forth.

2. In a valve whose casing has an intake portion which is connected to the outlet portion by means of a tapered channel that can be closed by a tapered plug the major portion of which is adapted to fit tightly into said channel, the combination of a movable shaft having a tubular portion which is extended into said channel and to which said plug is secured, with a stationary shaft secured to said outlet portion and extending partially into the tubular portion of said movable shaft; and two flexible permeable disks one of which has a resilient outer periphery and being attached to the outer extremity of the tubular portion of said movable shaft and resting with its outer periphery against the inner surface of the narrower portion of said tapered channel, whereas the other flexible permeable disk is attached to the interior of said casing and has a resilient inner perimeter which rests against the outer surface of said plug; said casing being provided with means for reciprocating said movable shaft and said plug, and said channel and said plug tapering toward said outlet portion, all substantially as described.

EUGENE S. ARNOLD.